H. SELLE, dec'd.
A. SELLE, Adm'r.
APPARATUS FOR MAKING COFFEE.
No. 179,820. Patented July 11, 1876.
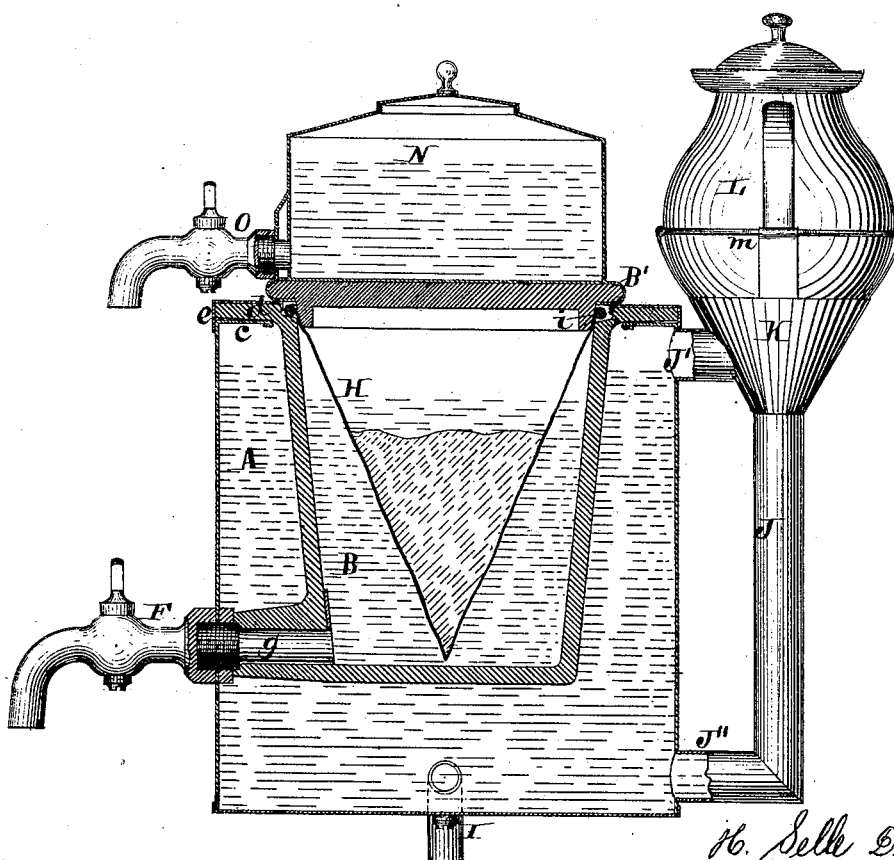

UNITED STATES PATENT OFFICE.

ALFRED SELLE, OF NEW YORK, N. Y., ADMINISTRATOR OF HUGO SELLE, DECEASED.

IMPROVEMENT IN APPARATUS FOR MAKING COFFEE.

Specification forming part of Letters Patent No. 179,820, dated July 11, 1876; application filed June 6, 1876.

*To all whom it may concern:*

Be it known that HUGO SELLE, late of the city, county, and State of New York, did invent a new and Improved Apparatus for Making Coffee and other beverages, which invention is fully set forth in the following specification, reference being had to the accompanying drawing, which represents a vertical central section of the apparatus.

This invention relates to improvements in coffee-pots, and consists in the combination, with a hot-water jacket and a coffee-pot arranged within the same, of a vertical steam-tube, connected both to the upper and to the lower parts of the jacket, and constructed with a funnel-shaped mouth for receiving and holding a tea-pot, all of which will be fully hereinafter described.

In the drawing, the letter A designates a water-tight jacket, within which is arranged a coffee-pot, B, the jacket A being provided with an inwardly-projecting flange, c, at its upper edge, and the coffee-pot B having an outwardly-projecting flange, d, at the same point, while, by means of these flanges, the coffee-pot is suspended within the jacket, a rim, e, being fitted and placed over the edge of the jacket, after the coffee-pot has been put in place.

The letter F designates a stop-cock, which is connected to the coffee-pot B, and which extends through and from the side of the jacket A. The method of connecting this stop-cock F to the coffee-pot B consists in providing the latter with a nipple, g, which is provided with an external screw-thread and made of such length as to project slightly through and from the outer surface of the jacket A, where the cock F is screwed on the end of the nipple, as shown. The joint between the nipple g and the coffee-pot B, as well as the jacket A, is packed in any suitable manner.

To prepare coffee or other beverage in the pot B, water or any other liquid is poured in the jacket A, and then the water is heated, by placing the jacket on a stove or in any other manner. Coffee-grounds and water are then put in the pot B and, by the action of the hot water in the jacket A, the coffee is made in the pot, while it can conveniently be kept heated.

The prepared coffee can be drawn from the pot B by means of the stop-cock F, and by drawing the coffee through this cock the coffee-pot is kept closed against the escape of the aroma or flavor of the coffee.

By preference the coffee-grounds are placed in a clearing-bag, H, which is provided with a wire rim, i, and supported by this rim on the upper edge of the pot B.

To the jacket A is connected a stop-cock, I, in addition to the cock F, so that the water heated in the jacket in the process of making coffee can be drawn off and used for any purpose—as, for instance, for making tea.

The coffee-pot B is made of stone or earthen-ware, and it has a lid, B', of the same material, so that neither the coffee or its fumes are allowed to come in contact with any corrosive surface, and hence it can be kept in a pure state for a great length of time.

The letter J designates vertical tube, which is connected to the side of the jacket A, and which terminates at the upper end in a funnel-shaped mouth, K. This funnel-shaped mouth K is adapted to receive a tea-pot, L, or any other like article, and it is preferably provided with a guard, m. The said tube J communicates with the upper part of the jacket A, through a lateral branch, J', and with the lower part of the jacket through a similar branch, J''. Hence the steam generated in the upper part of the jacket A in the process of making coffee, is led to the tube J, and to its funnel-shaped mouth K, where it acts on the tea pot L, and serves to keep the same in a heated state, while, as the steam comes in contact with the said tea-pot, the greater part of the steam is condensed and the products of condensation trickle down the tube J and are returned to the jacket A.

To the upper surface of the lid of the coffee-pot B may be attached a milk or cream vessel, N, so that when the coffee is being prepared the milk or cream will be heated at the same time. This vessel N is provided with a stop-cock, O, for drawing off the milk or cream.

What is claimed as new, and desired to be secured by Letters Patent, is—

In combination with the hot-water jacket A and the coffee-pot B within the jacket, the vertical steam-tube J, connected both to the upper and to the lower parts of the jacket, and having a funnel-shaped mouth, K, for the reception of a tea-pot, substantially as described.

In testimony that I claim the foregoing I have hereunto set my hand and seal this 24th day of May, 1876.

ALFRED SELLE, [L. S.]
*Administrator of the estate of Hugo Selle, deceased.*

Witnesses:
W. HAUFF,
E. F. KASTENHUBER.